United States Patent [19]
Schulz

[11] Patent Number: 5,797,972
[45] Date of Patent: Aug. 25, 1998

[54] SEWAGE SLUDGE DISPOSAL PROCESS AND PRODUCT

[75] Inventor: Helmut W. Schulz, Harrison, N.Y.

[73] Assignee: Dynecology, Inc., Harrison, N.Y.

[21] Appl. No.: 838,460

[22] Filed: Apr. 7, 1997

Related U.S. Application Data

[63] Continuation-in-part of Ser. No. 410,392, Mar. 27, 1995, Pat. No. 5,711,768, which is a continuation-in-part of Ser. No. 242,532, May 13, 1994, Pat. No. 5,431,702, which is a continuation-in-part of Ser. No. 37,086, Mar. 25, 1993, abandoned.

[51] Int. Cl.$^6$ .................... C10L 5/14; C10L 5/46
[52] U.S. Cl. .................. 44/552; 44/532; 44/577; 44/578
[58] Field of Search ........................................ 44/552

[56] References Cited

U.S. PATENT DOCUMENTS

| | | | |
|---|---|---|---|
| 4,159,684 | 7/1979 | Kirkup | 44/505 |
| 4,193,206 | 3/1980 | Maffet | 44/594 |
| 5,125,931 | 6/1992 | Schultz | 44/552 |
| 5,429,645 | 7/1995 | Benson et al. | 44/589 |
| 5,431,702 | 7/1995 | Schultz | 44/552 |
| 5,645,614 | 7/1997 | Dummersdorf et al. | 44/596 |
| 5,711,768 | 1/1998 | Schultz | 44/552 |

*Primary Examiner*—Ellen M. McAvoy
*Attorney, Agent, or Firm*—Thomas H. Whaley

[57] ABSTRACT

Pellets or briquettes useful as fuel are produced from sewage sludge solids. Mechanically stable pellets or briquettes result from combining a major portion of sewage sludge solids with lesser amounts of lime and binder materials suitable for imparting stability to the product and pressing or extruding the combined components into desired shapes. Coal may be included in the pellet or briquette composition for improved fuel value.

13 Claims, 1 Drawing Sheet

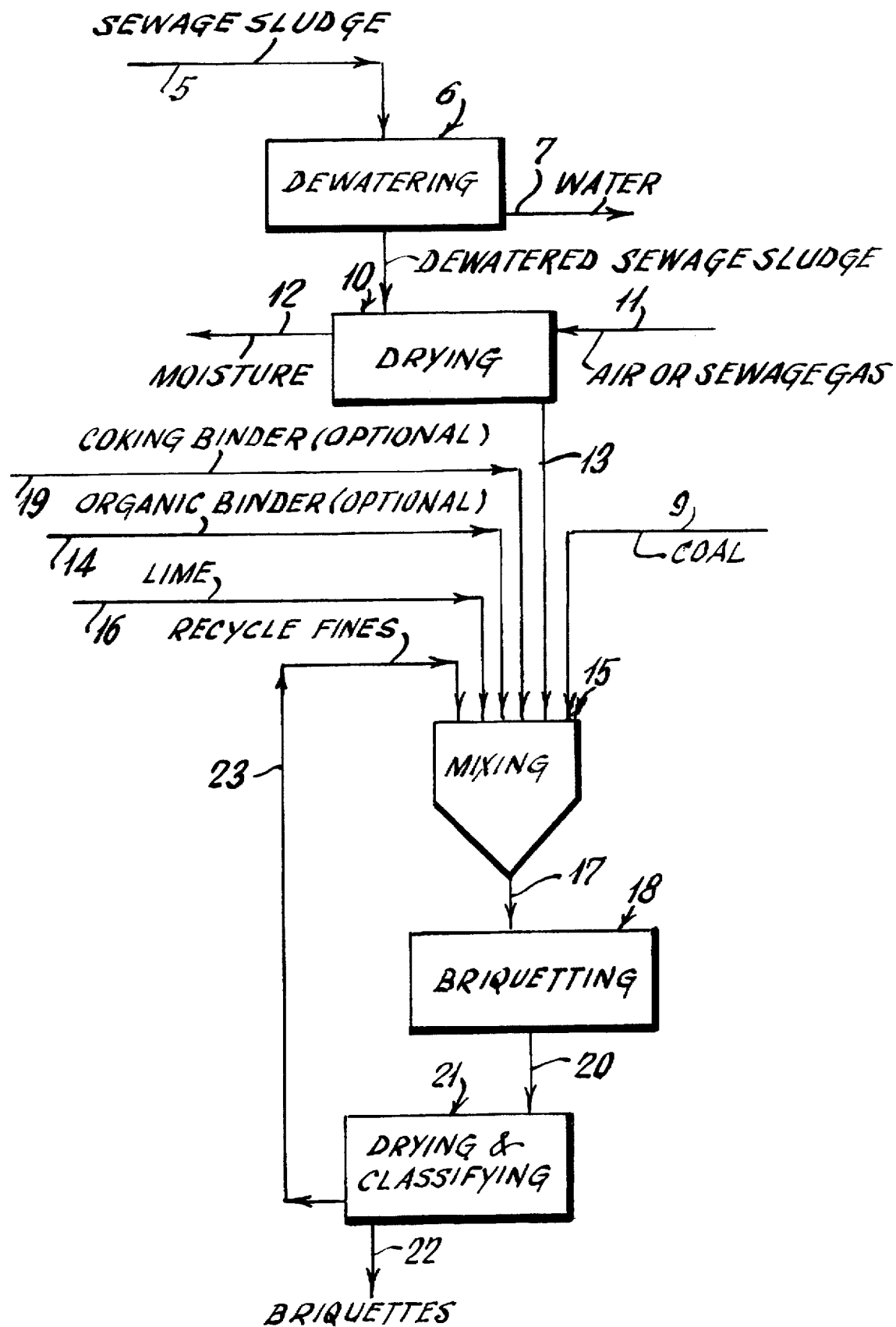

SEWAGE SLUDGE DISPOSAL PROCESS AND PRODUCT

This application is a continuation-in-part of my patent application, Ser. No. 08/410,392, filed Mar. 27, 1995, now U.S. Pat. No. 5,711,768 which is a continuation-in-part of Ser. No. 08/242,532, filed May 13, 1994, now U.S. Pat. No. 5,431,702, which is a continuation-in-part of Ser. No. 037,086, filed Mar. 25, 1993, abandoned.

This invention relates to a process for the production of mechanically stable briquettes or pellets useful as fuel from municipal sanitary sewage sludge solids and to the compositions so produced. An important aspect of this invention is that it provides a method for the production of a solid fuel product which may contain as much as 70 to 95 weight percent sewage sludge solids.

In one of its more specific aspects, this invention relates to a novel briquetted or pelleted fuel product containing a major amount of sewage sludge solids. In another specific aspect, this invention relates to a process for forming briquettes or solid pellets composed essentially of sewage sludge solids and lime, and to the resultant products. In another of its specific aspects, this invention relates to a process for production of solid fuel briquettes or pellets consisting essentially of sewage sludge solids, and a coke forming binder, and to resulting products. This invention includes fuel pellets or briquettes having novel compositions and physical properties.

Depending upon the desired properties of the fuel pellets or briquettes, products of the process of this invention may contain from about 50 to about 95 dry weight percent sewage sludge solids, and typically contain 70 weight percent or more sewage sludge solids on a dry weight basis. The product pellets or briquettes may comprise lime, organic binder, coking agent, or a combination thereof. Typical compositions are shown in the examples.

The process of this invention is designed to help solve the problem of disposition of sewage sludge. This is accomplished by converting dried or partially dried sewage sludge into usable fuel products. Wet sewage sludge from a municipal sanitary sewage treatment process, after removal of water by filtration, is in the form of a somewhat gelatinous mass typically containing 93 to 97 weight percent water and 3 to 7 weight percent sewage sludge solids. The sewage sludge solids may be concentrated by further dewatering methods, suitably by centrifuging the wet sewage sludge to yield a dewatered sewage sludge containing from about 50 to about 75 weight percent water. Typically, dewatered sewage sludge has little or no fuel value as such.

In accordance with this invention, wet sewage sludge is dewatered to the extent economically feasible by mechanical means, for example, by centrifuging and/or filtering the wet sewage sludge, after which the dewatered sewage sludge is further dried if necessary. A moisture content in the range of 5 to 25 weight percent is generally desirable. The reduction in water content of the sewage sludge solids may be accomplished by atmospheric drying in large area sand filter beds or by heat. Heat produced in the process, for example, waste heat from a gasifier or combustion gas turbine in a cogeneration cycle may be used effectively in further drying of the dewatered sewage sludge.

BACKGROUND OF THE INVENTION

The problems of disposal of municipal sewage sludge continue to grow in spite of a number of methods employed for or proposed for its disposal. In the United States, ocean dumping has been banned under Federal law. Alternative methods of disposal include dewatering the sewage sludge by the use of filters or centrifuges and burying the dewatered sewage sludge in land fill areas. Metropolitan areas are rapidly running out of available land fill sites. Many places in the United States prohibit inclusion of sewage sludge in land fills.

Incineration of sewage sludge solids has been proposed, but is not an attractive method of disposal due to the water content of moist centrifuged sludges or filter cake solids, which typically contain 65 to 75 weight percent water after concentration by conventional filtering or centrifuging methods.

The use of undewatered sewage sludge as fuel has been proposed heretofore in U.S. Pat. No. 4,405,332 to Rodriguez et al. As disclosed therein, raw sewage sludge is mixed with pulverized solid fuel, e.g., coal, to form a pumpable mixture. only very small percentages of sewage sludge solids may be disposed of by this method. This patent discloses a pumpable liquid fuel composition comprising 60 to 75 percent by weight solid fuel, e.g. coal, and from 25 to 40 weight percent undewatered sewage sludge consisting of 85 to 99.5 weight percent water (0.5 to 15 weight percent sewage sludge solids).

U.S. Pat. Nos. 4,552,266 and 4,615,711 to Muller discloses fuel briquettes containing from 0.3 to 0.6 parts sewage sludge solids per part autumn foliage (23 to 37.5 weight percent sewage sludge solids), and from 0.6 to 1.0 part sewage sludge solids per part solid residue resulting from solvent extraction of autumn foliage (37.5 to 50 weight percent sewage sludge solids) in each case mixed with cellulosic wastes.

U.S. Pat. No. 3,910,775 to Jackman discloses a process for treatment of garbage or refuse, coal fines, and raw sewage to form fuel briquettes containing undisclosed amounts of the garbage and sewage sludge components, which presumably are in the ratio normally occurring in municipal wastes.

My U.S. Pat. Nos. 4,152,119, 4,225,457, and 5,431,702 disclose processes for producing briquettes suitable as fuel in a moving bed gasifier from municipal solid wastes and crushed coal.

Among the various processes for disposal of sewage sludge are those which involve gasification of the sewage sludge solids by partial oxidation with air or oxygen to produce useful industrial and fuel gases. In my U.S. Pat. No. 5,431,702, dewatered sewage sludge containing 25 to 50 weight percent solids (50 to 75 weight percent water) is mixed with 1.5 to 5 parts by weight relatively dry waste paper or refuse derived fuel per part sewage sludge solids. This mixture, which may contain from about 4 to about 25 weight percent sewage sludge solids, is molded under pressure into briquettes or extruded to form pellets containing from about 5 to about 25 weight percent sewage sludge solids. In a preferred embodiment, these briquettes or pellets also contain 1 to 3 parts by weight crushed coal basis the weight of the sewage sludge solids, i.e. and the resulting mixture, which contains up to 12.5 weight percent sewage sludge solids, pressed into briquettes suitable for use as fuel in a moving bed type gasifier, e.g. a Lurgi gasifier or a slagging gasifier.

In the earlier processes for the production of briquettes containing sewage sludge solids, cellulosic solids, including paper waste and municipal solids waste, are employed to provide sufficient structural strength to the briquettes to withstand normal handling. Caking coal also has been employed to provide high temperature structural strength when the briquettes are used as fuel in a large moving bed gasifier, e.g., a Lurgi type gasifier.

BRIEF DESCRIPTION OF THE INVENTION

By the process of this invention, high structural strength briquettes with a high sewage sludge solids content may be made from dry or partially dried sewage sludge. The fuel briquettes of this invention may contain 50 weight percent or more sewage sludge solids and may be formulated to possess the strength necessary to support the burden in a moving bed gasifier without undue crushing of the briquettes.

In accordance with a preferred embodiment of my invention, the preparation of fuel briquettes containing 50 weight percent or more sewage sludge solids, two distinct types of binders are employed. A water soluble or hydrophilic organic binder, for example molasses, is mixed with the sewage sludge solids in an amount necessary to impart sufficient green strength to the pressed or extruded pellets to permit them to withstand normal handling without undue breakage. In general, the amount of water soluble or hydrophilic organic binder required depends on its solids content. Binder solids contents in the product in the range of 5 to 8 weight percent on the basis of the weight of sewage sludge solids in the product are preferred. A carbonaceous coking agent, e.g. solid bitumen or pitch, or solid asphaltic petroleum residuum, in particle form, is added to the sewage sludge solids/organic binder mixture to form a high temperature binder and provide high crush strength to the briquettes when heated to coking temperature in a gasifier. The mixture may also contain from about 25 to about 50 weight percent coal basis the weight of the sewage sludge solids. In accordance with a preferred embodiment, a mixture of dry or partially dried sewage sludge solids, lime, organic binder, crushed coal, and bitumen or pitch is formed into briquettes or pellets by mechanical compression from a briquette press or extrusion device as known in the art. Prior to formation into briquettes or pellets, the moisture content of the mixture should be in the range of from about 12 to about 22 weight percent. Compression at a pressure in the range of from about 1,000 to about 10,000 pounds per square inch, preferably at a pressure in the range of from about 3,000 to about 5,000 psi produces stable briquettes or pellets. The resulting briquettes or pellets are suitable for use as fuel in a moving bed gasifier.

As disclosed and claimed in my copending application, Ser. No. 07/410,392, sewage sludge solids which have been dried to a moisture content in the range of from about 0 to about 25 weight percent moisture (75 to 100 weight percent sewage sludge solids) are mixed with lime and optionally a hydrophilic or water soluble organic binder to form a composition having a moisture content in the range of from about 12 to about 22 weight percent and the composition compressed into briquettes or pellets at a pressure in the range of from about 1,000 to about 10,000 pounds per square inch, preferably at a pressure in the range of from about 3,000 to about 5,000 pounds per square inch. The resulting briquettes are suitable for use as fuel in conventional furnaces designed to burn particulate fuels. The briquettes or pellets may be further dried in ambient air or in heated air or flue gas if desired.

Briquettes or pellets consisting primarily of sewage sludge solids may be comminuted, mixed with a coking agent, e.g., pitch or bitumen, or petroleum residuum, or a mixture of non-caking coal and coking agent, and pressed into briquettes or pellets, suitably at a pressure in the range of from about 1,000 to about 10,000 psi, preferably 3,000 to 5,000 psi. The coking agent imparts sufficient high temperature crush strength to the briquettes or pellets to permit their use as fuel in a moving bed gasifier. Briquettes containing caking coal generally do not require any additional coking agent as binder.

Pellets produced without a coking agent i.e. from sewage sludge solids, lime, and water soluble or hydrophilic organic binder only are preferred when the sewage sludge solids are to be shipped some distance from the municipal sewage sludge source to the consumption site. For example, sewage sludge solids from the Eastern seaboard may be pelleted and shipped to the Appalachian area or to the Western states for conversion to coal-containing briquettes or pellets. The coal-containing briquettes or pellets may be gasified to produce fuel gas or synthesis gas, heat and power at the conversion site or shipped to other areas for such purposes.

BRIEF DESCRIPTION OF THE DRAWING

The FIGURE is a flow diagram illustrating one preferred procedure for carrying out the process of this invention.

DETAILED DESCRIPTION OF THE INVENTION

With reference to the drawing, sewage sludge from an available source, for example, sludge from a municipal sanitary sewage treatment plant, is supplied from line 5 to a dewatering operation 6. Sewage sludge from such plants which are suitable for use in the process of this invention may be in the form of primary (undigested) sludge, sludge-activated sludge, digested sludge, or a combination of the various sludges typically produced at sewage treatment facilities. In accordance with one embodiment of this invention, sewage sludge supplied through line 5 is dewatered mechanically by means of a centrifuge, vacuum filter, filter press or screw press or combination thereof in a dewatering step 6 yielding dewatered sewage sludge (DSS), usually referred to as a DSS cake, containing from 20 to 40 weight percent sewage sludge solids (60 to 80 weight percent water). Water removed from the sewage sludge dewatering step 6 is discarded through line 7.

The resultant dewatered sewage sludge cake is passed through line 8 to dryer 10 wherein it is dried to a solids content of 65 weight percent or higher. The dryer suitably is in the form of a rotary kiln or steam-heated dryer of a type known in the art. As illustrated in the FIGURE, air or flue gas is supplied to the dryer through line 11 and moisture-laden air or flue gas discharged from the dryer through line 12.

The partially dried sewage sludge solids (SSS) leave the dryer through line 13 from which they are supplied to mixer 15 where they are thoroughly blended with a hydrophilic or water soluble organic binder material from line 14. If desired, coal may be supplied to mixer 15 through line 9 and coking agent may be supplied from line 19. Lime or other fluxing agent is supplied through line 16. The resultant mixture containing from about 12 to about 22 weight percent water is passed through line 17 to a briquetting facility 18 where briquettes or pellets are formed by an extrusion device or a briquette press at a pressing pressure typically in the range of 1,000 to 10,000 pounds per square inch (psi), preferably in the range of 3,000 to 5,000 psi. The pellets or briquettes leave the briquetting facility through line 20. To assure uniformity of product size, the pellets or briquettes may be screened and/or dried in a screening and drying operation designated generally by the numeral 21. The product briquettes exit the process through line 22. Broken pieces and fines generated in the process are returned to the mixing step 15 through line 23.

The moisture content of the feed mixture supplied through line 17 to the briquetting step 18 from the mixing step 15 is an important factor affecting not only the operation of the briquetting machines but also the strength of the ensuing briquettes or pellets, hereinafter referred to as the "green strength" of these products. A moisture content of the feed mixture in the range of 12 to 22 weight percent produces pellets and briquettes having sufficient green strength to withstand normal handling with only nominal breakage. The optimum moisture content of the feed mixture depends to some extent upon the characteristics of the particular feed materials employed, the relative proportion of each material in the feed mixture, and upon the compaction method.

For typical sewage sludge solid mixtures formed into briquettes using a rotary press, the moisture content of the briquette forming composition supplied to the briquetting press is preferably in the range of from about 14 to about 19 weight percent. Pellet extrusion requires a higher moisture content (up to 22 percent) in the feed mixture in order to prevent charring of the sewage sludge solids during extrusion. Preferably, briquettes are formed by pressing the feed composition in a rotary briquetting press of the type available from Bepex Corporation, Minneapolis, Minn. wherein the briquettes are formed under a pressure above about 1000 psi, suitably in the range of 3000 to 5000 psi. Briquettes leaving the press are steaming hot from the energy expended in their formation under pressure. The freshly pressed briquettes may be further dried before use as fuel, primarily to permit the green briquettes to develop increased mechanical strength. Briquettes having a moisture content in the range of from about 10 to about 12 weight percent have excellent green strength.

Product briquettes or pellets obtained by the process of this invention without the addition of coal or coking agent component may comprise at least 80 weight percent sewage sludge solids (dry basis).

Pellets or briquettes produced for use as fuel in a fixed bed or a moving bed gasifier, e.g. a Lurgi type gasifier or a slagging bed gasifier, require not only adequate green strength, but also high temperature crush strength. High crush strength is provided by adding a high temperature coking agent to the sewage sludge mixture in mixer 15 through line 19. Either caking coal or non-caking coal with an added coking agent may be included as a component of the mixture. Coking agents suitable for use include normally solid pitch or bitumen. Non-caking coal may be included in the product briquettes or pellets to improve the heating value of the product. In that case, the non-caking coal is added to the mixture with one or more coking agents or supplied through line 19. In general, the amount of coal, including coking agent when added, is supplied to the mixture in an amount in the range of from about 25 to about 100 weight percent, basis the dry weight of the sewage sludge solids, i.e., in a ratio of 1:4 to 1:1.

Water soluble or hydrophilic organic binders may be selected from the group black liquor from the paper industry, black strap molasses, starch, brewery waste, residual syrup from the refining of sugar beets, polysaccharides, lignin sulfonates, and the like. The concentration of organic binder additive required may be determined by trial for any given binder and source of sewage sludge. The amount of organic binder solids in the product may range from 0 to 8 weight percent and is preferably at the minimum concentration that will endow the briquette or pellet with adequate physical strength to avoid crushing during normal handling procedures. All of the above-mentioned organic binders are suitable for the production of briquettes or pellets by my process with sufficient green strength to permit handling, transporting and utilization of the pellets as fuel in conventional furnaces. When the briquettes or pellets are to be used as fuel in a fixed or moving bed gasifier where high temperatures occur in the burden passing through the pyrolysis and coking zones of the gasifier, caking coal or coking agents are included in their compositions. Coking agents include normally solid pitch or bitumen, suitably from petroleum refinery residues, which form coke in the pyrolysis and coking sections of a gasifier. Such pellets or briquettes gravitate without substantial loss of structural strength or excessive deformation through the moving bed to the hearth section of the gasifier where they are gasified with air or oxygen and steam in known manner as described more particularly in my U.S. Pat. No. 4,225,173.

In order to endow the "green" briquettes or pellets, i.e., pellets or briquettes from the briquette press, extruder, or compactor, with anti-fungal stability during transport and storage, from about 3 to about 12 weight percent lime is included in the formulation. The lime acts as a bonding agent and serves as a fluxing agent when the pellets are consumed in a slagging gasifier.

The agglomerates, in the form of pellets or briquettes, including extruded cylinders, or pressed forms, may be employed as furnace fuel or as a gasifier feedstock, either as such, or in admixture with a non-caking combustible solid, for example, lump coal of controlled size, petroleum coke, wood char, or "Simplex" briquettes. Simplex briquettes are comprised of paper waste and/or refuse derived fuel as more particularly described in my U.S. Pat. No. 4,152,119. Employing a feed-stock comprised primarily of sewage sludge solids in the form of pellets or briquettes is advantageous from the standpoint of maximizing the tipping fee income that normally attends the disposal of sewage sludge in an environmentally benign manner. An admixture with coal or petroleum coke, on the other hand, will enhance the energy yield in the form of a clean synthesis or fuel gas. The latter is a desirable fuel for advanced gas turbines of an IGCC (integrated gasification, combined cycle) power plant. This mode of operation is preferred for municipalities or principalities that command a relatively modest supply of sewage sludge solids. The co-processing of petroleum coke, or Simplex briquettes leads to economies of scale in the gasification and power generating components of the plant.

The feedstock described above may be processed in a variety of gasifiers, including especially the following: an oxygen-blown, high-pressure slagging gasifier (of the British Gas/Lurgi type), an oxygen-blown, high pressure dry-bottom gasifier (of the Lurgi type), an air-blown low-pressure, dry-bottom gasifier (of the Wellman Galusha type), and a fluid bed gasifier (of the Winkler type). The use of a slagging gasifier, for example, as disclosed in my U.S. Pat. No. 4,340,397, is recommended when processing sewage sludges from industrialized metropolitan centers (such as Newark, N.J.) where the sludge is likely to be contaminated with unacceptable concentrations of toxic heavy metals. In a slagging gasifier of the type recommended, the toxic heavy metals are encapsulated in a glassy frit, which has been shown to be non-leachable by accepted EPA standards. Dry-bottom gasifiers may be operated at a sufficiently high temperature to effect partial sintering of the ash. This mode of operation reduces the leachability of the resultant ash. The inclusion of coal, or a coking agent, e.g. bitumen or pitch, serves to reduce the concentration of heavy metals in the resultant ash or slag. When employed, coking agent, i.e. bitumens, may comprise from about 2 to about 30 weight percent of the composition, dry basis, depending on the total charge to the gasifier. When the charge to the gasifier is limited to the briquettes or pellets produced as described herein, the coking binder content of the briquettes or pellets is limited to an amount which will avoid sticking together of the briquettes or pellets during coking in the gasifier. In general, compositions containing not more than 12 weight percent coking agent, and preferably from about 2 to about 8 weight percent coking agent, are most satisfactory.

The product gas from the gasifier typically is passed through a standard gas clean-up train to remove acid gases and other air pollutants. Hydrogen sulfide may be recovered by one of several commercially available processes and converted to elemental sulfur in a Claus unit. These procedures are state-of-the-art, and need not be further described here, as they are not part of this invention, per se.

EXAMPLES

Compositions of briquettes which may be produced in accordance with this invention may vary somewhat depending upon variables inherent in sewage sludges and in water soluble organic binders, e.g. molasses, and hydrophilic organic binders, e.g. food starch. Representative suitable components and product compositions are illustrated in the following examples (Tables I and II).

Suitable formulations for any given combination of components may be determined by preparing test briquettes using a two part die and a hydraulic press. Green test specimens are dried and subjected to handling, such as by tumbling in a rock tumbler. Test specimens containing a coking agent are evaluated for crush strength by heating them to 1000° F. in a ceramic furnace followed by cooling and pressing the briquettes between flat plates.

In the following Examples 1–3, and 7, 8, 10, and 11, a commercially available anhydrous lignin sulfonate containing 5 percent moisture as received, and marketed under the trade name Norlig, is employed as the water soluble organic binder. In Example 4, the water soluble organic binder is molasses; in Examples 5 and 9, the water soluble organic binder is black liquor from the paper industry; and in Example 6, only lime and water are used as binders.

In Examples 1–6 (Table I), the briquettes are formed without an added coking agent. In Examples 7–10, sewage sludge briquettes suitable for use in a fixed or moving bed gasifier are produced with pyrolized pitch from petroleum refinery residue as coking agent or coking binder. In Example 11, coking coal requires no added coking agent and acts as high temperature binder. In Example 11, non-caking coal is combined with pitch which acts as a coking binder. All briquettes contain high concentrations of sewage sludge solids.

TABLE I

| Component (parts by weight) | Example 1 | 2 | 3 | 4 | 5 | 6 |
|---|---|---|---|---|---|---|
| Concentrated Sludge | 100 | 100 | 100 | 100 | 100 | 100 |
| Sewage Sludge Solids | 76 | 80 | 85 | 80 | 85 | 100 |
| Water | 24 | 20 | 15 | 20 | 15 | 0 |
| Lime | 4.6 | 4.8 | 5.1 | 4.8 | 5 | 8 |
| Organic Binder | 5.6 | 6.0 | 6.3 | 9.8 | 12 | — |

TABLE I-continued

| Component (parts by weight) | Example 1 | 2 | 3 | 4 | 5 | 6 |
|---|---|---|---|---|---|---|
| Solids | 5.3 | 5.7 | 6.0 | 6.4 | 6 | — |
| Water | 0.3 | 0.3 | 0.3 | 3.4 | 6 | 16 |
| Total | 110.2 | 110.8 | 111.4 | 114.6 | 117 | 124 |
| Total Solids | 86.2 | 90.5 | 96.1 | 91.2 | 96 | 108 |
| Total Water | 24.3 | 20.3 | 15.3 | 23.4 | 21 | 16 |
| Wt. % Moisture | 22 | 18.4 | 13.7 | 20.4 | 18 | 12.9 |
| Briquette Composition (wt. % dry basis) | | | | | | |
| Sewage Sludge Solids | 88.5 | 88.4 | 88.4 | 87.7 | 88.5 | 92.6 |
| Lime | 5.4 | 5.3 | 5.3 | 5.3 | 5.2 | 7.4 |
| Binder Solids | 6.2 | 6.3 | 6.2 | 7.0 | 6.3 | — |

TABLE II

| Component (parts by weight) | Example 7 | 8 | 9 | 10 | 11 |
|---|---|---|---|---|---|
| Concentrated Sludge | 100 | 100 | 100 | 100 | 100 |
| Sewage Sludge Solids | 80 | 70 | 75 | 70 | 70 |
| Water | 20 | 30 | 25 | 30 | 30 |
| Lime | 6 | 5 | 5 | 8 | 6 |
| Organic Binder | 6 | 5 | 9 | 5 | 8 |
| Solids | 5.7 | 4.75 | 4.5 | 4.75 | 7.6 |
| Water | 0.3 | 0.25 | 4.5 | 0.25 | 0.4 |
| Coking Binder | | | | | |
| Pitch | 20 | 35 | 35 | 8 | — |
| Coal (dry weight) | | | | | |
| Non-caking | — | — | — | 35 | — |
| Caking | — | — | — | — | 70 |
| Total | 132 | 144.5 | 149 | 156 | 184 |
| Solids | 111.7 | 114.8 | 119.5 | 125.8 | 150 |
| Water | 20.3 | 30.2 | 29.5 | 30 | 34 |
| Wt. % Moisture | 15 | 21 | 19.8 | 19.2 | 18.4 |
| Briquette Composition (wt. % dry basis) | | | | | |
| Sewage Sludge Solids | 71.6 | 61 | 62.7 | 55.7 | 47 |
| Lime | 5.4 | 4.4 | 4.2 | 6.4 | 4 |
| Organic Binder Solids | 5.1 | 4.1 | 3.8 | 3.8 | 5 |
| Coking Agent | | | | | |
| Pitch | 17.9 | 30.5 | 29.3 | 6.4 | — |
| Coal | — | — | — | 27.8 | 44 |

I claim:

1. A method for the preparation of pressed fuel briquettes or pellets consisting essentially of sewage sludge solids and crushed coal which comprises:
   a. mixing dehydrated sewage sludge containing from about 70 to about 95 weight percent solids with crushed coal wherein the ratio of coal to sewage sludge solids on a dry basis is in the range of from about 1:3 to about 3:1 and with from about 2 to about 12 percent bitumen or pitch on a dry weight basis; and
   b. compressing the resulting mixture into briquettes or pellets.

2. A method according to claim 1 wherein the coal is a non-caking coal.

3. A method according to claim 1 wherein the mixture further contains lime.

4. A method according to claim 1 in which the mixture further contains organic binder material solids in a concentration ranging from about 2 to about 6 weight percent basis the dry weight of the composite mixture.

5. A method according to claim 4 in which the binder material is selected from the group consisting of molasses, black liquor, lignin derivatives, brewery waste, starch, sugar syrup and polysaccharides.

6. A composition of matter in the form of pressed bricks, briquettes, or pellets useful as fuel consisting of sewage sludge solids and crushed coal with from about 2 to about 12 weight percent bitumen or pitch on a dry basis as a coking agent wherein the ratio of coal to sewage sludge solids is in the range of from about 1:3 to about 3:1 on the basis of dry weights of sewage sludge solids and coal.

7. A composition according to claim 6 wherein the composition further includes from about 2 to about 6 percent solids of an organic binder material on a dry weight basis.

8. A composition of matter according to claim 6 wherein the coal is a non-caking coal.

9. A composition according to claim 6 wherein the composition includes from about 2 to about 8 percent lime on a dry weight basis.

10. A composition according to claim 6 wherein the composition includes from about 2 to about 6 percent organic binder material solids on a dry weight basis.

11. A composition according to claim 6 wherein the composition includes from about 2 to about 5 percent lime and from about 2 to about 6 percent organic binder material solids on a dry weight basis.

12. A composition in the form of pressed bricks, briquettes or pellets useful as fuel produced by combining:

a) a major amount of dehydrated sewage sludge containing from about 70 to about 95 weight percent sewage sludge solids with from about 3 to about 12 dry weight percent lime and from about 2 to about 12 percent bitumen or pitch on a dry weight basis with b) an organic binder material sufficient to provide from about 2 to about 6 dry weight percent binder solids and from about 12 to about 22 weight percent moisture in the resulting mixture; and c) pressing or extruding the resultant mixture into mechanically stable pellets or briquettes.

13. A composition of matter according to claim 12 wherein the organic binder material is selected from the group consisting of molasses, black liquor, starch, brewery waste, sugar syrup, polysaccharides, and lignin sulfonates.

* * * * *